United States Patent [19]
Pirnie

[11] 3,934,350
[45] Jan. 27, 1976

[54] PHOTO CROPPING DEVICE
[75] Inventor: Larry H. Pirnie, Topeka, Kans.
[73] Assignee: Josten's, Inc., Minneapolis, Minn.
[22] Filed: Aug. 22, 1974
[21] Appl. No.: 499,581

[52] U.S. Cl. .................................. 33/94; 33/180 R
[51] Int. Cl.² .......................................... B43L 13/00
[58] Field of Search .......... 33/180 R, 174 G, 92, 95, 33/98, 94

[56] References Cited
UNITED STATES PATENTS
2,782,513   2/1957   Brandt ................................. 33/94

Primary Examiner—Richard E. Aegerter
Assistant Examiner—Willis Little
Attorney, Agent, or Firm—Dorsey, Marquart, Windhorst, West & Halladay

[57] ABSTRACT

An improved geometrical instrument for laying out and proportioning photographs and the like including a pair of angle members disposed in overlapping relationship, a diagonal strut connecting said angle members together for limited movement and means securing said angle members and strut together for selected relative movement between said angle members. The instrument of the present invention also includes an inset edge located at the apex of each of the included angles of the angle members to enable the user to make crop marks accurately reflecting the desired area.

7 Claims, 7 Drawing Figures

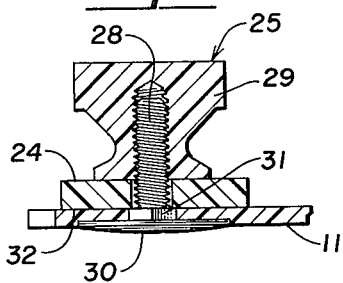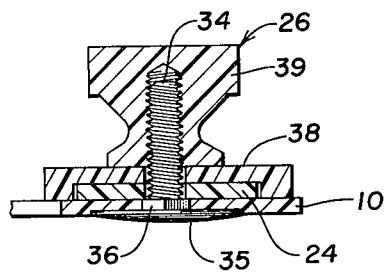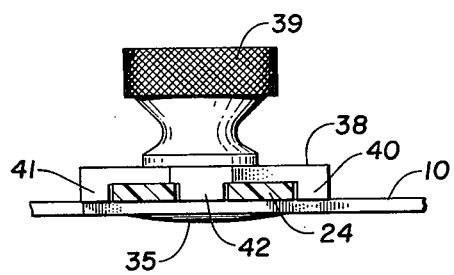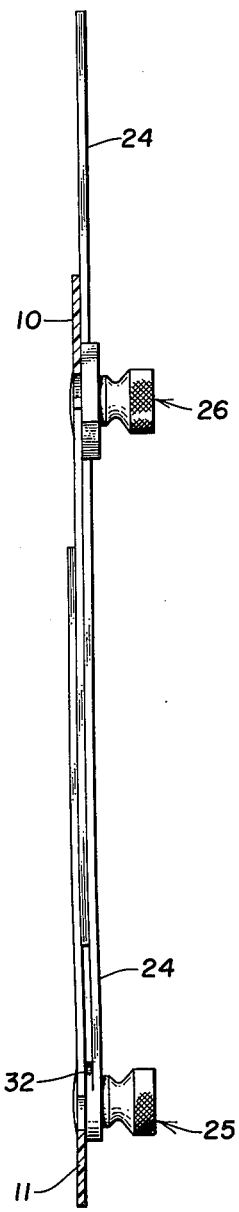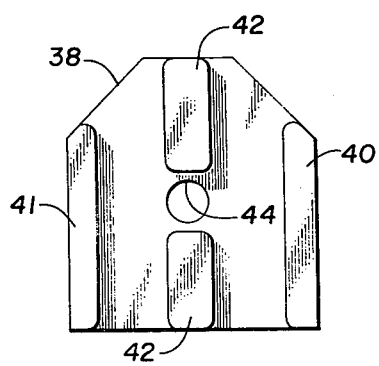

PHOTO CROPPING DEVICE

BACKGROUND AND SUMMARY OF THE INVENTION

The present invention relates generally to a geometrical instrument for laying out and proportioning photographs and the like and more specifically, to a cropping device used, for example, in cropping from a photograph to a layout and from a layout to a photograph.

Cropping devices are generally old in the art. Most of these prior art devices are quite similar in that they each comprise a pair of angle members, usually right angle members, arranged in opposed overlapping relationship such that the inner edges of such angle members define a parallelogram, usually a rectangle. These angle members are usually connected together by a diagonally disposed bar or strut which adjustably connects the pair of angle members for movement toward and away from each other to vary the size of the parallelogram or other area defined therebetween. In some of the prior art cropping devices, the diagonal strut is connected to and extends between the apexes of the angle members; while in others, the diagonal strut is connected with and extends between the angle members at a point spaced to one side of the apex of the angle members so that the strut is parallel to, but spaced from, a line passing through the apex of the angle members. In this latter type of cropping device, the inside or included corner of the angle members is not obstructed from view. An example of the latter type of cropping device is described in U.S. Pat. No. 2,782,513.

The primary purpose of the geometrical instruments or cropping devices referred to above is for cropping from photographs to layouts or from layouts to photographs. In either event, the use of such a device involves an adjustment or movement of the angle members to a desired shape and size, and means for retaining the angle members in a fixed position such that only selected relative movement of the angle members is thereafter permitted. The relative movement permitted enables the user to transfer an area of that particular size and shape or an area of proportional shape, either smaller or larger, from a photo to a layout or vice versa. To accomplish the transfer of this area from one medium to another, crop marks were made with a pen or pencil at at least two of the inside or included corners of the resulting area. If the crop marks are made at the inside or included angles of each of the angle members, it is necessary that the diagonal bar or strut be disposed to one side of the apex to expose such angles visually, thereby permitting the crop marks to be made.

The making of such a crop mark in prior art cropping devices, however, gives rise to certain disadvantages of these prior art devices primarily because of the thickness of the crop mark itself and the space required to make such mark. In the prior art devices, the crop mark was made on the inside edge or corner of the resulting area. Thus, when the cropping device was removed, the crop mark actually reflected an area slightly smaller than that framed by the cropping instrument.

In contrast to the prior art, the present invention relates to a geometrical instrument or cropping device which includes a pair of angle members positioned in overlapping relationship and a diagonal bar or strut extending between and connecting said angle members together in adjustable relationship, with such diagonal strut connected to each of said angle members at a point other than at the apex of the angle members. The cropping device of the present invention further includes means for securing said angle members and strut together for selected relative movement and means by which crop marks may be made which account for and compensate for the thickness of such crop marks and the space required to make the same. Also, the present invention includes means for connecting the diagonal bar or strut with each of the angle members such that the bottom surface of such angle members remains relatively flush to avoid scratching or catching on photographs or layouts with which the device is used.

Accordingly, it is an object of the present invention to provide an improved geometrical instrument or cropping device which compensates for the thickness of the crop marks and the space required to make the same so that such crop marks accurately reflect the specific picture or photograph area desired.

Another object of the present invention is to provide a geometrical instrument or cropping device wherein the diagonal strut is connected to said angle members at a point other than the apex of the angle members and which includes means at the apex of the included angles of such angle members for making crop marks which accurately reflect the specific picture area framed by the cropping device.

A further object of the present invention is to provide a cropping device having a flush bottom surface to prevent such device from catching on photographs or layouts with which the device is used.

These and other objects of the present invention will become apparent with reference to the drawings, the description of the preferred embodiment and the appended claims.

DESCRIPTION OF THE DRAWINGS

FIG. 3 is a sectional view of one of the locking knobs of the device of the present invention as viewed along the line 3—3 of FIG. 1.

FIG. 4 is a sectional view of the other locking knob of the device of the present invention as viewed along the line 4—4 of FIG. 1.

FIG. 5 is a sectional view as viewed along the line 5—5 of FIG. 1.

FIG. 6 is a sectional view as viewed along the line 6—6 of FIG. 1.

FIG. 7 is a plan view of the underside of the bridge used in the device of the present invention.

DESCRIPTION OF THE PREFERRED EMBODIMENT

Figure 1:
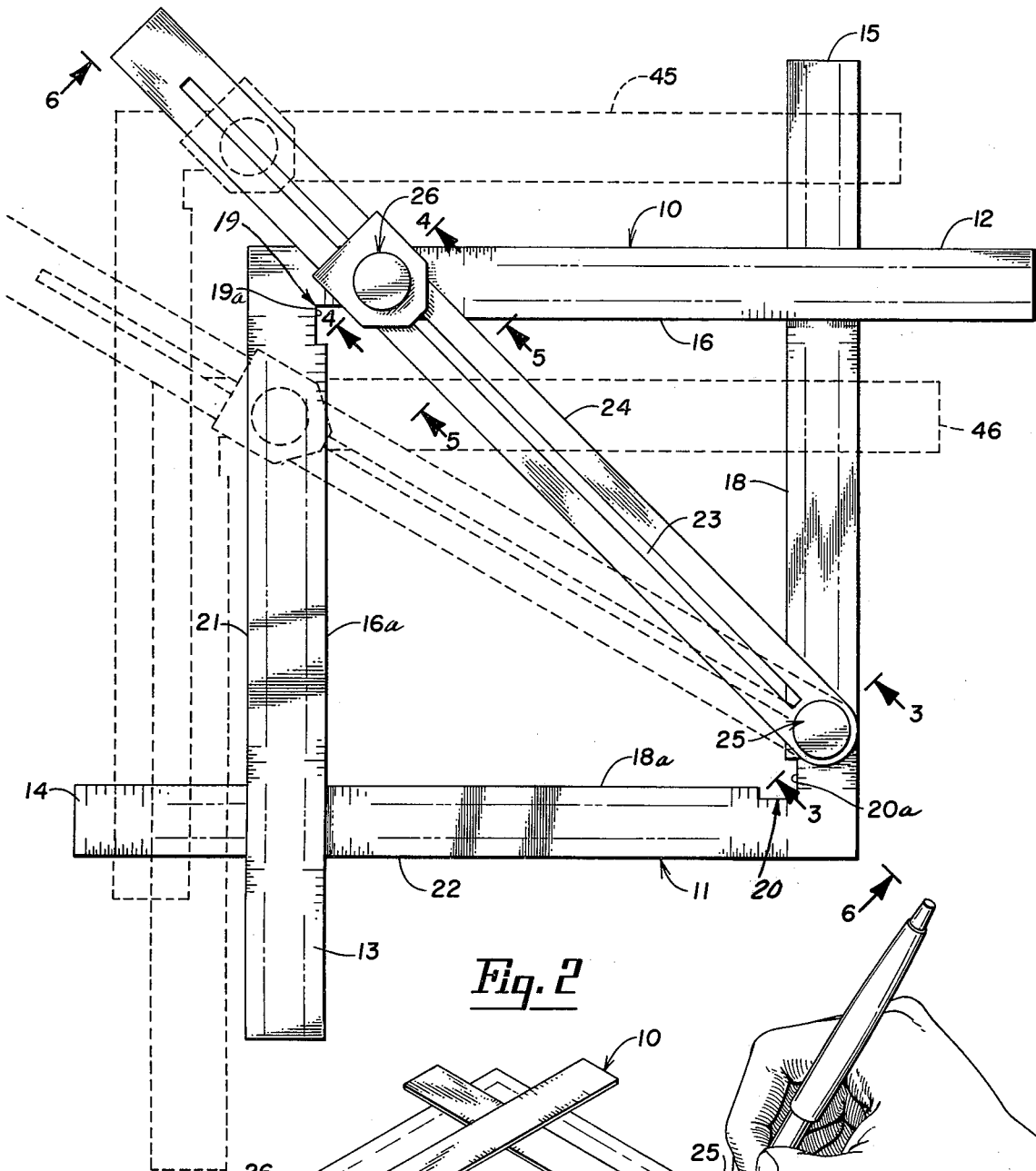
FIG. 1 is a plan view of the geometrical instrument of the present invention.

With reference first to FIG. 1, the cropping device of the present invention includes a pair of relatively thin, flat angle members 10 and 11 positioned in overlapping relationship. Each of the angle members 10 and 11 includes a pair of sides 12, 13 and 14, 15, respectively, connected at right angles with each other. In the preferred embodiment, the 90° angle member 10 is illustrated as being disposed on top of the 90° angle member 11. Each of the angle members 10 and 11 also includes a pair of inner, straight edges 16, 16a and 18, 18a respectively, which, in the preferred embodiment are disposed at right angles with each other to form an included angle 19 and 20, respectively, therebetween. Although the included angles formed by the edges 16, 16a and 18, 18a are normally right angles, it is contemplated that the advantages of the present invention could be utilized as long as such included angles are less than 180°.

Figure 2:
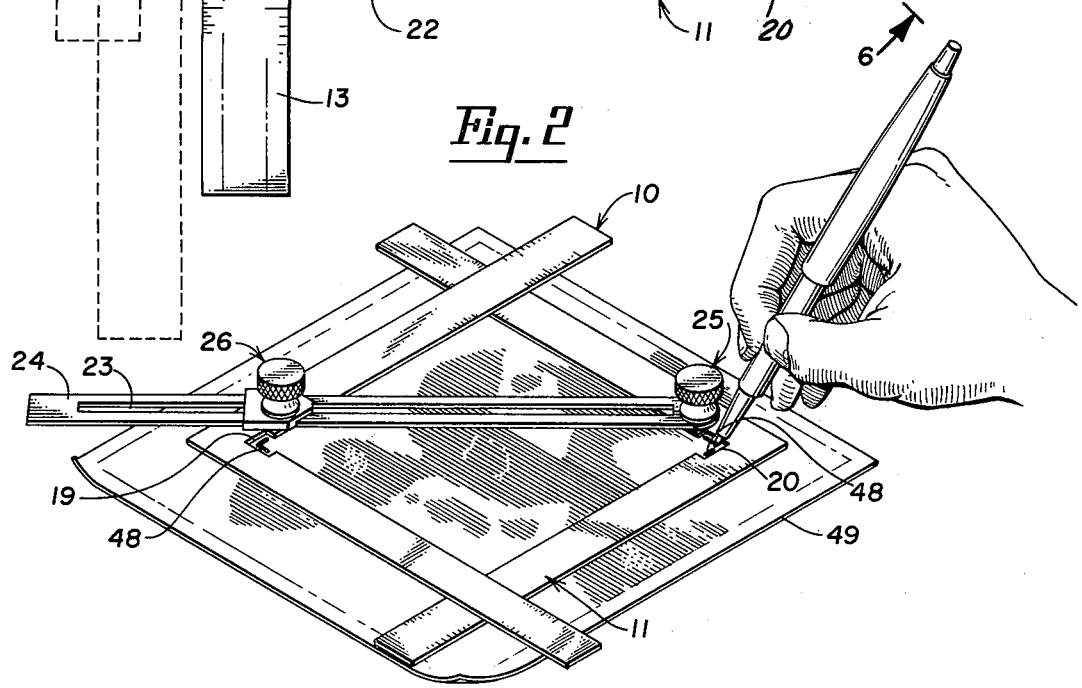
FIG. 2 is a perspective view of the geometrical instrument of the present invention showing such instrument in use.

Each of the corners 19 and 20 includes an inset edge or corner 19a and 20a respectively which is inset from the inner edges 16, 16a and 18, 18a of the angle members 10 and 11. As illustrated in FIG. 2, the primary purpose of such inset edges is to enable the user to make cropping marks 48, 48 (FIG. 2) which accurately reflect the specific area of the picture, photograph or the like framed by the device and intended to be cropped. The amount which each of the inset edges 19a and 20a is inset from the inner edges 16, 16a and 18, 18a should correspond to the space necessary to make the cropping mark. This distance normally would include the thickness of the crop mark itself as well as the distance between such mark and the drawing edge. The particular length of each leg of the inset edges 19a and 20a is not critical; however, such legs must be sufficiently long to make a proper crop mark, but should also be short enough to prevent distorting or misrepresenting the area to be cropped.

Each of the angle members 10 and 11 further includes graduations along both its inner edges 16, 16a and 18, 18a and along its outer edges 21 and 22 to aid the user in cropping areas having desired dimensions and to enable the user to arrange the angle members 10 and 11 so that they form the desired angles with the other. In the preferred embodiment, it is contemplated that the scales on each of the inner edges 16, 16a and 18, 18a and outer edges 21 and 22 should be different, thus giving the user alternative scales which he could use in his cropping process.

With further reference to FIGS. 1 and 2, it can be seen that the angle members 10 and 11 are adjustably connected in overlapping relationship by a slotted, diagonally disposed bar or strut member 24. Specifically, the strut 24 extends between the angle members 10 and 11 with one end pivotally connected with the angle member 11 by the connecting means 25, while the other end of the strut 24 is connected in sliding relationship with the angle member 10 by the connecting means 26. In the preferred embodiment the strut 24 is connected with each of the angle members 10 and 11 at a point other than the apex of the included angles 19 and 20 of said angle members, so that the apex of said included angles, specifically the inset edges 19a and 20a, are visually exposed. Preferably, the strut 24 is connected with the members 10 and 11 such that it is parallel to a line passing through the apexes of the included angles 19 and 20 of the members 10 and 11.

As illustrated best in FIG. 3 which is a sectional view of the means 25 for pivotally connecting the strut 24 with the angle member 11, it can be seen that the connecting means 25 includes a bolt 28 extending from the lower surface of the angle member 11 up through a hole in the strut 24 where it is threadedly secured by a locking knob 29. The bolt 28 includes a relatively thin, flat head portion 30 which is partially imbedded into the lower surface of the angle member 11 so that it is flush with the lower surface of the angle member, thereby minimizing the possibility that such bolt would scratch or catch the photograph being cropped. The bolt 28 also includes a square shoulder portion 31 disposed immediately above the flat head 30 which is adapted to fit into an opening in the angle member 11 of approximately the same shape and size to prevent the bolt 28 from turning when the locking nut 29 is tightened or loosened. As also illustrated in FIG. 3, as well as FIG. 6, the end of the strut 24 connected to the angle member 11 includes a spacing portion 32 integrally formed with the strut 24. The primary purpose of this spacing portion 32 is to allow free, unrestricted pivotal movement of the strut 24 relative to the angle member 11 and to compensate for the fact that the angle member 10 overlays the angle member 11. The locking knob 29 is adapted for threaded connection with the threaded portion of the bolt 28 such that when the locking knob is tightened, the strut 24 is held between the locking knob and the angle member 11, thus securing those elements in a relatively fixed position.

As illustrated in FIGS. 4, 5 and 7, the means 26 for slidably connecting the strut 24 with the angle member 10 includes a threaded bolt 34 having a relatively thin, flat head portion 35 and a square shoulder portion 36. As illustrated, the bolt 34 extends upwardly through the angle member 10, the strut 24 and the bridge member 38 at which point it is adapted for threaded connection with the locking knob 39. Similar to the connecting means illustrated in FIG. 3, the head portion 35 in FIG. 4 is partially imbedded into the lower surface of the locking member 10 to provide a relatively flush lower surface, thus preventing such elements from snagging or catching on photographs or other materials being cropped. Also, similar to the connecting means of FIG. 3, the square shoulder portion 36 of the bolt 34 is adapted for insertion into a square opening of approximately the same shape and size in the angle member 10 to prevent the bolt 34 from turning when the knob 39 is tightened or loosened. When the locking knob 39 is tightened over the bolt 34, the elements 38 and 10 are held in a relatively fixed position, permitting sliding movement of the elements 38 and 10 along the strut 24. When both locking knobs 29 and 39 are tightened, the angle members 10 and 11 are held in a fixed position such that only sliding movement of the angle member 10 is permitted along the strut 24. In this manner the size of the area cropped can be changed without affecting the proportions of the area.

As illustrated best in FIG. 7 which is a plan view of the underside of the bridge member 38, the bridge member 38 includes a pair of parallel ridges 40 and 41 which are spaced apart to permit the strut 24 to slide therebetween. The bridge member 38 also includes a center ridge portion 42 which is disposed within the elongated slot 23 of the strut member. The bridge 38 includes a hole 44 in its center portion to accommodate the bolt 34. To permit the above mentioned sliding movement of the angle member 10 when the knob 39 is tightened, it is necessary that the thickness of the ridges 40, 41 and 42 be slightly greater than the thickness of the strut 24.

Although the use of geometrical instruments or cropping devices of the general type to which the present invention relates is well known to those skilled in the art, a brief discussion of the operation of the present invention will be described as follows: First of all, as described above, the cropping device of the present invention, and specifically, the angle members 10 and 11 are adjustable to a variety of positions. The relative movement or adjustability of such members is accomplished by loosening the locking knobs 29 and 39 and positioning the angle members 10 and 11 with respect to each other as desired. When the members 10 and 11 are in position so that the desired cropping area is achieved, the locking knobs 29 and 39 are tightened, thus holding the members 10 and 11 in a fixed position with respect to each other and enabling that area, or a larger or smaller area of the same proportions, to be transferred to another medium.

To use the device of the present invention for cropping from layout to photo, the locking knobs 29 and 39 are first loosened. Next, the device is layed on the layout form with the inside edges 16, 16a and 18, 18a (FIG. 1) aligned with the specific picture area desired. When this is accomplished, the knobs 29 and 39 are tightened, thus securing the members 10 and 11 in a fixed position with respect to each other. The rigid device is then placed over the photo and the upper half of the device, the angle member 10, is moved along the slotted, diagonal strut 24 until the area of the photo desired to be reproduced is within the proportional area. The inset edges 19a and 20a are used as guides to make the crop marks 48, 48 as illustrated in FIG. 2.

For cropping from photo to layout, the locking knobs 29 and 39 are again loosened and the device is layed on the photo, enclosing the portion of the photo desired to be reproduced. The locking knobs 29 and 39 are then tightened, forming the cropping device into a fixed structure. The device is then placed over the layout form and the upper half of the device, angle member 10, is moved along the slotted, diagonal bar 24 until the reproduction size desired is within the proportional area. The inset edges 19a and 20a are then used as guides for drawing the picture area on the layout form similar to the manner illustrated in FIG. 2.

Although the description of the preferred embodiment of the present invention has been quite specific, it is contemplated that various changes and modifications could be made to such embodiment without deviating from the spirit of the present invention. Thus, the scope of the present invention is intended to be dictated by the appended claims rather than by the description of the preferred embodiment.

I claim:

1. A geometrical instrument for laying out and proportioning photographs and the like comprising:
   a pair of angle members positioned in overlapping relationship, each of said angle members having a pair of straight edges forming an included angle of less than 180°;
   a strut extending between said pair of angle members and connected with each of said angle members at a point other than the apex of said included angle such that said included angle is visually exposed, said strut permitting limited selective relative movement between said pair of angle members; and
   an inset corner at the apex of each of said included angles to enable one employing the instrument to make cropping marks which accurately reflect the specific area of the photographs and the like, framed by the instrument.

2. The geometrical instrument of claim 1 wherein each of said inset corners includes a pair of inset legs inset from the corresponding pair of straight edges forming the included angle.

3. The geometrical instrument of claim 2 wherein each of said inset corners provides a guide for making a cropping mark and wherein the inset legs of each of said inset corners is inset from its corresponding straight edge a distance equal to the distance necessary to make said cropping mark.

4. The geometrical instrument of claim 3 wherein the legs of said inset corners are of sufficient length to make said cropping marks.

5. The geometrical instrument of claim 1 wherein said strut includes means for securing said angle members together to permit only relative movement of said angle members along said strut.

6. The geometrical instrument of claim 5 wherein said strut is pivotally connected with one of said angle members and slidably connected with the other of said angle members.

7. The geometrical instrument of claim 6 having a flush lower surface.

* * * * *